(12) United States Patent
Kim et al.

(10) Patent No.: US 11,316,150 B2
(45) Date of Patent: Apr. 26, 2022

(54) CATHODE FOR LITHIUM SECONDARY BATTERY AND LITHIUM SECONDARY BATTERY COMPRISING THE SAME

(71) Applicant: LG Chem, Ltd., Seoul (KR)

(72) Inventors: Hye-Bin Kim, Daejeon (KR); Jung-Seok Choi, Daejeon (KR); Song-Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 17 days.

(21) Appl. No.: 16/337,165

(22) PCT Filed: Jun. 25, 2018

(86) PCT No.: PCT/KR2018/007184
§ 371 (c)(1),
(2) Date: Mar. 27, 2019

(87) PCT Pub. No.: WO2018/236200
PCT Pub. Date: Dec. 27, 2018

(65) Prior Publication Data
US 2019/0229330 A1    Jul. 25, 2019

(30) Foreign Application Priority Data
Jun. 23, 2017    (KR) .................. 10-2017-0079977

(51) Int. Cl.
*H01M 4/36*    (2006.01)
*H01M 10/0525*    (2010.01)
(Continued)

(52) U.S. Cl.
CPC ............. *H01M 4/366* (2013.01); *H01M 4/13* (2013.01); *H01M 4/131* (2013.01); *H01M 4/505* (2013.01);
(Continued)

(58) Field of Classification Search
CPC .................................................... H01M 4/366
See application file for complete search history.

(56) References Cited

U.S. PATENT DOCUMENTS

2005/0202316 A1*  9/2005  Hwang ................ H01M 4/505
                                                        429/231.1
2006/0099495 A1   5/2006  Suzuki et al.
(Continued)

FOREIGN PATENT DOCUMENTS

CN       1667865 A      9/2005
CN     101981728 A      2/2011
(Continued)

OTHER PUBLICATIONS

Machine translation of JP 2000-011995 A (Year: 2000).*
(Continued)

*Primary Examiner* — Robert S Carrico
(74) *Attorney, Agent, or Firm* — Lerner, David, Littenberg, Krumholz & Mentlik, LLP

(57) ABSTRACT

Disclosed is a positive electrode for a lithium secondary battery, which includes: a positive electrode current collector; and a positive electrode active material layer including an upper layer portion and a lower layer portion, wherein each of the upper layer portion and the lower layer portion of the positive electrode active material layer includes a positive electrode active material, binder polymer and a conductive material, and the positive electrode active material has an electroconductivity of 0.0001-0.0004 S/cm, and the content of the conductive material contained in the lower layer portion is 10-59 parts by weight based on 100 parts by weight of the content of the conductive material contained in the upper layer portion, or the positive electrode active material has an electroconductivity of 0.008-0.015 S/cm, and the content of the conductive material contained in the lower layer portion is 10-30 parts by weight based on 100
(Continued)

parts by weight of the content of the conductive material contained in the upper layer portion.

13 Claims, 3 Drawing Sheets

(51) Int. Cl.
*H01M 4/525* (2010.01)
*H01M 4/62* (2006.01)
*H01M 4/505* (2010.01)
*H01M 10/052* (2010.01)
*H01M 4/13* (2010.01)
*H01M 4/131* (2010.01)
*H01M 4/02* (2006.01)

(52) U.S. Cl.
CPC .......... *H01M 4/525* (2013.01); *H01M 4/622* (2013.01); *H01M 4/625* (2013.01); *H01M 10/052* (2013.01); *H01M 10/0525* (2013.01); *H01M 2004/028* (2013.01)

(56) References Cited

U.S. PATENT DOCUMENTS

| | | | |
|---|---|---|---|
| 2007/0026312 A1* | 2/2007 | Imachi | H01M 4/131 429/217 |
| 2008/0318133 A1* | 12/2008 | Matsuyama | H01M 4/366 429/300 |
| 2010/0285356 A1 | 11/2010 | Choi et al. | |
| 2011/0020703 A1 | 1/2011 | Suzuki et al. | |
| 2011/0217594 A1* | 9/2011 | Awano | H01M 10/0525 429/232 |
| 2013/0224584 A1 | 8/2013 | Sung et al. | |
| 2014/0127583 A1 | 5/2014 | Han et al. | |
| 2014/0162118 A1* | 6/2014 | Chu | H01M 4/366 429/211 |
| 2015/0311512 A1* | 10/2015 | Paulsen | H01M 10/052 429/219 |
| 2016/0211523 A1 | 7/2016 | Ueda et al. | |
| 2017/0005334 A1 | 1/2017 | Takaichi et al. | |
| 2017/0092943 A1 | 3/2017 | Li et al. | |
| 2017/0256788 A1 | 9/2017 | Umeyama et al. | |
| 2018/0006291 A1 | 1/2018 | Kim et al. | |

FOREIGN PATENT DOCUMENTS

| | | |
|---|---|---|
| CN | 103165863 A | 6/2013 |
| CN | 103650212 A | 3/2014 |
| CN | 105098193 A | 11/2015 |
| CN | 106716688 A | 5/2017 |
| EP | 3147971 A1 | 3/2017 |
| JP | 2000011995 A | 1/2000 |
| JP | 2000011995 A * | 1/2000 |
| JP | 2006134770 A | 5/2006 |
| JP | 2007035589 A | 2/2007 |
| JP | 2009064714 A | 3/2009 |
| JP | 2016058309 A | 4/2016 |
| JP | 2017063027 A | 3/2017 |
| KR | 20100121387 A | 11/2010 |
| KR | 20120124077 A | 11/2012 |
| KR | 20140137660 A | 12/2014 |
| KR | 20150028663 A | 3/2015 |
| KR | 20160111673 A | 9/2016 |
| KR | 20170014299 A | 2/2017 |
| KR | 20170014299 A * | 2/2017 |
| WO | 2015046492 A1 | 4/2015 |
| WO | 2016038440 A1 | 3/2016 |

OTHER PUBLICATIONS

Machine translation of KR 2017-0014299 A (Year: 2017).*
Extended European Search Report with Written Opinion for Application No. EP18819607.5 dated Feb. 7, 2020, 8 pages.
Search report from International Application No. PCT/KR2018/007184, dated Oct. 19, 2018.
Search Report for Chinese Application No. 201880001003.4 dated Oct. 27, 2021. 4 pgs.

* cited by examiner

CATHODE FOR LITHIUM SECONDARY BATTERY AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2018/007184 filed Jun. 25, 2018, which claims priority from Korean Patent Application No. 10-2017-0079977 filed Jun. 23, 2017, all of which are incorporated herein by reference.

TECHNICAL FIELD

The present disclosure relates to a positive electrode for a lithium secondary battery and a lithium secondary battery including the same. More particularly, the present disclosure relates to a positive electrode for a lithium secondary battery having improved nail penetration stability, and a lithium secondary battery including the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles.

In this context, electrochemical devices have been most spotlighted. Among such electrochemical devices, development of rechargeable secondary batteries has been focused. Recently, when developing such batteries, research and development for designing novel electrodes and batteries have been conducted in order to improve capacity density and specific energy.

Among the commercially available secondary batteries, lithium secondary batteries developed in the early 1990's have been spotlighted, since they have a higher operating voltage and significantly higher energy density as compared to conventional batteries, such as Ni-MH batteries, N-Cd batteries and sulfuric acid-lead batteries using an aqueous electrolyte.

In addition, since there has been an increasing need for providing such lithium secondary batteries with high output and high energy density, risk of ignition and explosion has been increased and development of lithium secondary batteries have caused degradation of safety. However, battery safety is an essential consideration in developing lithium secondary batteries, in addition to high capacity and high output. Thus, there is a need for improving battery safety.

DISCLOSURE

Technical Problem

When a nail penetration test is carried out, a battery cell undergoes a short-circuit by a nail penetrating through the battery cell. The inventors of the present disclosure have found that nail penetration stability can be improved by increasing the resistance of an active material layer adjacent to a current collector when a short-circuit occurs so that the short circuit current may be reduced. The present disclosure is based on this finding.

The present disclosure is directed to providing a positive electrode for a lithium secondary battery which has improved safety while providing an initial output and long-term cycle characteristics equal to those of the battery according to the related art, and a lithium secondary battery including the same.

In addition, the inventors of the present disclosure have focused on the fact that a battery cell further including a conductive material layer between a current collector and an active material layer has a portion which causes an increase in thickness but generates no capacity of the battery cell, thereby causing loss of energy density.

Therefore, one aspect of the present disclosure is intended to provide a positive electrode for a lithium secondary battery which has improved nail penetration stability through an increase in resistance during nail penetration, and a lithium secondary battery including the same.

Another aspect of the present disclosure is intended to provide a positive electrode for a lithium secondary battery which has improved safety against ignition and explosion, and a lithium secondary battery including the same.

Technical Solution

In one aspect of the present disclosure, there is provided a positive electrode for a lithium secondary battery.

According to the first embodiment of the present disclosure, there is provided a positive electrode for a lithium secondary battery, which includes:

a positive electrode current collector; and a positive electrode active material layer including an upper layer portion and a lower layer portion, wherein each of the upper layer portion and the lower layer portion of the positive electrode active material layer includes a positive electrode active material, binder polymer and a conductive material, and the positive electrode active material has an electroconductivity of 0.0001-0.0004 S/cm, and the content of the conductive material contained in the lower layer portion is 10-59 parts by weight based on 100 parts by weight of the content of the conductive material contained in the upper layer portion, or the positive electrode active material has an electroconductivity of 0.008-0.015 S/cm, and the content of the conductive material contained in the lower layer portion is 10-30 parts by weight based on 100 parts by weight of the content of the conductive material contained in the upper layer portion.

According to the second embodiment, there is provided the positive electrode for a lithium secondary battery according to the first embodiment, wherein the positive active material and the binder polymer contained in the upper layer portion are the same as those contained in the lower layer portion.

According to the third embodiment, there is provided the positive electrode for a lithium secondary battery according to the first or the second embodiment, wherein the positive electrode active material has an electroconductivity of 0.0001-0.0004 S/cm and includes $Li_x(Ni_aCo_bMn_c)O_2$ ($0.5<x<1.3$, $0.5<a<0.7$, $0<b<1$, $0<c<1$, $a+b+c=1$), or the positive electrode active material has an electroconductivity of 0.008-0.015 S/cm and includes $Li_x(Ni_aCo_bMn_c)O_2$ ($0.5<x<1.3$, $0.7<a<1$, $0<b<1$, $0<c<1$, $a+b+c=1$).

According to the fourth embodiment, there is provided the positive electrode for a lithium secondary battery according to the third embodiment, wherein the $Li_x(Ni_aCo_bMn_c)O_2$ ($0.5<x<1.3$, $0.5<a<0.7$, $0<b<1$, $0<c<1$, $a+b+c=1$) is Li(Ni$_{0.6}$Co$_{0.2}$Mn$_{0.2}$)O$_2$, and the Li$_x$(Ni$_a$Co$_b$Mn$_c$)O$_2$ (0.5<x<1.3, 0.7<a<1, 0<b<1, 0<c<1, a+b+c=1) is Li(Ni$_{0.8}$Co$_{0.1}$Mn$_{0.1}$)O$_2$.

According to the fifth embodiment, there is provided the positive electrode for a lithium secondary battery according to any one of the first to the fourth embodiments, wherein the conductive material used for the upper layer portion is the same as that used for the lower layer portion.

According to the sixth embodiment, there is provided the positive electrode for a lithium secondary battery according to any one of the first to the fifth embodiments, wherein the lower layer portion has a thickness equal to or smaller than the thickness of the upper layer portion.

According to the seventh embodiment, there is provided the positive electrode for a lithium secondary battery according to any one of the first to the sixth embodiments, wherein the conductive material is at least one selected from the group consisting of carbon black, graphite, carbon fibers, carbon nanotubes, metal power, conductive metal oxides and organic conductive material, or a combination of two or more of them.

According to the eighth embodiment, there is provided the positive electrode for a lithium secondary battery according to any one of the first to the seventh embodiments, wherein the positive electrode active material is Li$_x$(Ni$_a$Co$_b$Mn$_c$)O$_2$(0.5<x<1.3, 0.5<a<0.7, 0<b<1, 0<c<1, a+b+c=1), and the content of the conductive material contained in the lower layer portion is 12-57 parts by weight based on 100 parts by weight of the content of the conductive material contained in the upper layer portion, or the positive electrode active material is Li$_x$(Ni$_a$Co$_b$Mn$_c$)O$_2$(0.5<x<1.3, 0.7<a<1, 0<b<1, 0<c<1, a+b+c=1), and the content of the conductive material contained in the lower layer portion is 12-30 parts by weight based on 100 parts by weight of the content of the conductive material contained in the upper layer portion.

According to the ninth embodiment, there is provided the positive electrode for a lithium secondary battery according to any one of the first to the eighth embodiments, wherein the content of the conductive material contained in the upper layer portion is 0.5-3.0 parts by weight based on 100 parts by weight of the positive electrode active material of the upper layer portion, and the content of the conductive material contained in the lower layer portion is 0.3-2.0 parts by weight based on 100 parts by weight of the positive electrode active material of the lower layer portion.

In another aspect, there is also provided a lithium secondary battery.

According to the tenth embodiment of the present disclosure, there is provided a lithium secondary battery including: the positive electrode as defined in any one of the first to the ninth embodiments; a negative electrode; and a separator interposed between the positive electrode and the negative electrode.

Advantageous Effects

According to an embodiment of the present disclosure, the upper layer and the lower layer of the active material layer are designed to have a different content of conductive material so that the positive electrode may have resistance that varies with the height of the positive electrode.

According to another embodiment of the present disclosure, the positive electrode is designed to have resistance that varies with the height of the positive electrode, while the content of the conductive material in the solid content forming the active material layer is not increased. Thus, it is possible to maximize the loading of the active material.

According to still another embodiment of the present disclosure, it is possible to provide a lithium secondary battery which includes the positive electrode, and thus shows improved safety as determined through a nail penetration test and has improved cycle characteristics.

According to yet another embodiment of the present disclosure, it is possible to provide a positive electrode for a lithium secondary battery which has improved cycle characteristics as well as an improved nail safety effect, and a lithium secondary battery including the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
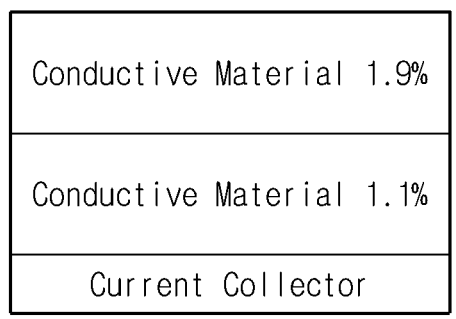
FIG. 1 is a sectional view illustrating the positive electrode according to Example 1.
Figure 2:
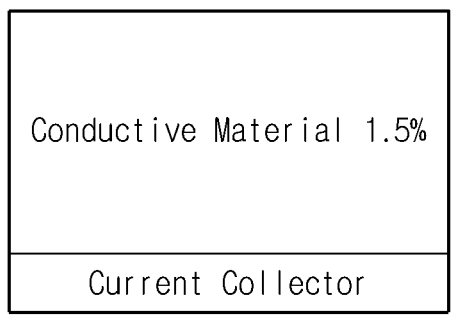
FIG. 2 is a sectional view illustrating the positive electrode according to Comparative Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a positive electrode for a lithium secondary battery, which includes: a positive electrode current collector; and a positive electrode active material layer including an upper layer portion and a lower layer portion, wherein each of the upper layer portion and the lower layer portion of the positive electrode active material layer includes a positive electrode active material, binder polymer and a conductive material, and the positive electrode active material has an electroconductivity of 0.0001-0.0004 S/cm, and the content of the conductive material contained in the lower layer portion is 10-59 parts by weight based on 100 parts by weight of the content of the conductive material contained in the upper layer portion, or the positive electrode active material has an electroconductivity of 0.008-0.015 S/cm, and the content of the conductive material contained in the lower layer portion is 10-30 parts by weight based on 100 parts by weight of the content of the conductive material contained in the upper layer portion.

As used herein, 'lower layer portion' means a positive electrode active material layer directly facing a positive electrode current collector.

As used herein, 'upper layer portion' means a positive electrode active material layer stacked on the surface of the lower layer portion.

According to an embodiment of the present disclosure, the content of the conductive material contained in the lower layer portion may be 10-59 parts by weight based on 100 parts by weight of the content of the conductive material contained in the upper layer, and the positive electrode active material may have an electroconductivity of 0.0001 S/cm-0.0004 S/cm, 0.0015 S/cm-0.0035 S/cm, or 0.002 S/cm-0.003 S/cm.

According to an embodiment of the present disclosure, the content of the conductive material contained in the lower layer portion may be 10-30 parts by weight based on 100 parts by weight of the content of the conductive material contained in the upper layer, and the positive electrode active material may have an electroconductivity of 0.008 S/cm-0.015 S/cm, 0.009 S/cm-0.014 S/cm, or 0.01 S/cm-0.012 S/cm.

As mentioned above, a positive electrode active material including portions having different electroconductivities is used for the present disclosure. When using a positive electrode active material having higher electroconductivity, the content of a conductive material contained in the lower layer portion may be decreased. In other words, in this case, the content of the conductive material contained in the lower layer portion based on the content of the conductive material contained in the upper layer portion may be smaller as compared to the positive electrode using a positive electrode active material having lower electroconductivity.

According to a particular embodiment of the present disclosure, the positive electrode active material may have an electroconductivity of 0.0001-0.0004 S/cm, and may include $Li_x(Ni_aCo_bMn_c)O_2$ ($0.5<x<1.3$, $0.5<a<0.7$, $0<b<1$, $0<c<1$, $a+b+c=1$). Herein, $Li_x(Ni_aCo_bMn_c)O_2$ ($0.5<x<1.3$, $0.5<a<0.7$, $0<b<1$, $0<c<1$, $a+b+c=1$) may be $Li(Ni_{0.6}Co_{0.2}Mn_{0.2})O_2$.

According to another embodiment of the present disclosure, the positive electrode active material may have an electroconductivity of 0.008-0.015 S/cm, and may include $Li_x(Ni_aCo_bMn_c)O_2$ ($0.5<x<1.3$, $0.7<a<1$, $0<b<1$, $0<c<1$, $a+b+c=1$). Herein, $Li_x(Ni_aCo_bMn_c)O_2$ ($0.5<x<1.3$, $0.7<a<1$, $0<b<1$, $0<c<1$, $a+b+c=1$) may be $Li(Ni_{0.8}Co_{0.1}Mn_{0.1})O_2$.

According to still another embodiment of the present disclosure, when the positive electrode active material is $Li_x(Ni_aCo_bMn_c)O_2$ ($0.5<x<1.3$, $0.5<a<0.7$, $0<b<1$, $0<c<1$, $a+b+c=1$), the content of the conductive material contained in the lower layer portion may be 11-58, or 12-57 parts by weight, based on 100 parts by weight of the content of the conductive material contained in the upper layer portion.

According to still another embodiment of the present disclosure, when the positive electrode active material is $Li_x(Ni_aCo_bMn_c)O_2$ ($0.5<x<1.3$, $0.7<a<1$, $0<b<1$, $0<c<1$, $a+b+c=1$), the content of the conductive material contained in the lower layer portion may be 10-30, 11-30, or 12-30 parts by weight, based on 100 parts by weight of the content of the conductive material contained in the upper layer portion.

According to the present disclosure, when the content of the conductive material in the lower layer portion is less than the lower limit, the corresponding positive electrode has excessively low conductivity, and thus the battery cell cannot realize capacity sufficiently. When the content of the conductive material in the lower layer portion is larger than the upper limit, it is not possible to improve nail penetration safety derived from a decrease in conductivity of the lower layer portion.

Meanwhile, according to the present disclosure, when the conductive material is used within the above-defined range, it is possible to provide a positive electrode for a lithium secondary battery which passes a nail safety test and shows improved cycle characteristics by using the positive electrode active material in the above-described manner.

In another aspect of the present disclosure, there is provided a positive electrode including: a positive electrode current collector; and a positive electrode active material layer having an upper layer portion and a lower layer portion, wherein the conductivity of the lower layer portion can be reduced by using a conductive material for each of the upper layer portion and the lower layer portion and using a conductive material having a smaller specific surface area for the lower layer portion.

The specific surface area of the conductive material contained in the upper layer portion may be 100-300 times, 110-290 times, or 120-280 times of the specific surface area of the conductive material contained in the lower layer portion, taken as 100.

In addition, when the conductive material used for the lower layer portion has a smaller surface area and is used in a smaller amount as compared to the upper layer portion, it is possible to improve the effect of improving nail safety significantly.

The upper layer portion and the lower layer portion may be formed to have the same thickness or a different thickness. When the lower layer portion having lower conductivity is formed to have a smaller thickness, the cell may provide more improved output or long-term characteristics. According to an embodiment, the lower layer portion may have a thickness of about 5 μm or more. Particularly, the lower layer portion may have a thickness of 6 μm-100 μm, 10 μm-95 μm, or 15 μm-90 μm. When the lower layer portion is formed to have a thickness of about 5 μm or more, it is possible to manufacture an electrode when considering the size of the active material. It is also possible to improve the output or performance of the cell and to provide improved processability.

According to an embodiment of the present disclosure, the positive electrode active material may include a large-diameter positive electrode active material and a small-diameter positive electrode active material.

According to another embodiment of the present disclosure, when the positive electrode active material has an electroconductivity of 0.0001-0.0004 S/cm, the large-diameter positive electrode active material may have a D50 diameter of 8 μm-20 μm, and the small-diameter positive electrode active material may have a D50 diameter of 3 μm-7 μm. Herein, the positive electrode active material having an electroconductivity of 0.0001-0.0004 S/cm may be $Li_x(Ni_aCo_bMn_c)O_2$ ($0.5<x<1.3$, $0.5<a<0.7$, $0<b<1$, $0<c<1$, $a+b+c=1$), particularly $Li(Ni_{0.6}Co_{0.2}Mn_{0.2})O_2$.

Meanwhile, in the case of the positive electrode active material including the large-diameter positive electrode active material and the small-diameter positive electrode active material, the weight ratio of the large-diameter positive electrode active material and the small-diameter positive electrode active material may be 9:1-8:2, 7:3-6:4, or 5:5.

According to an embodiment of the present disclosure, when the positive electrode active material has an electroconductivity of 0.008 S/cm-0.015 S/cm, the large-diameter positive electrode active material may have a D50 diameter of 8 μm-20 μm and the small-diameter positive electrode active material may have a D50 diameter of 3 μm-7 μm. Herein, the positive electrode active material having an electroconductivity of 0.008 S/cm-0.015 S/cm may be $Li_x(Ni_aCo_bMn_c)O_2$ (0.5<x<1.3, 0.7<a<1, 0<b<1, 0<c<1, a+b+c=1), particularly $Li(Ni_{0.8}Co_{0.1}Mn_{0.1})O_2$.

Meanwhile, in the case of the positive electrode active material including the large-diameter positive electrode active material and the small-diameter positive electrode active material, the weight ratio of the large-diameter positive electrode active material and the small-diameter positive electrode active material may be 9:1-8:2, 7:3-6:4, or 5:5.

It is possible to control the output and cell performance to a desired level by controlling the small diameter, large diameter and the weight ratio of the small diameter and the large diameter as described above. In addition, it is possible to enhance the effect of improving nail penetration safety by increasing the weight proportion of the small-diameter positive electrode active material having a large specific surface area.

According to an embodiment of the present disclosure, it is possible to minimize the content of the conductive material and to maximize the content of the active material by designing the different content of the conductive material contained in each of the upper layer portion and the lower layer portion of the positive electrode. Thus, it is possible to provide a high loading level of the active material.

According to the present disclosure, it is preferred to use the same ingredients, such as the active material and the binder polymer, forming each of the upper layer portion and the lower layer portion, other than the conductive material. If desired, a different kind of compound may be used. In addition, the ingredients forming the upper layer portion and the lower layer portion, other than the conductive material, may have the same compositional ratio.

The conductive material is not particularly limited, as long as it is an electroconductive material causing no chemical change in an electrochemical device. The conductive material used for the upper layer portion may be the same as that used for the lower layer portion. In general, carbon black, graphite, carbon fibers, carbon nanotubes, metal powder, conductive metal oxides, organic conductive materials, etc. may be used as the conductive material used for the upper layer portion may be the same as that used for the lower layer portion, respectively. Commercially available products of conductive materials include acetylene black (available from Chevron Chemical Company, Gulf Oil Company, etc.), ketjen Black EC (available from Armak Company), Vulcan XC-72 (available from Cabot Company), Super P (available from MMM Company), or the like.

According to an embodiment of the present disclosure, the content of the conductive material used for the upper layer portion may be 0.5-3.0 parts by weight, 0.7-2.9 parts by weight, or 0.9-2.8 parts by weight, based on 100 parts by weight of the positive electrode active material used for the upper layer portion.

The content of the conductive material used for the lower layer portion may be 0.3-2.0 parts by weight, 0.3-1.8 parts by weight, or 0.3-1.6 parts by weight, based on 100 parts by weight of the positive electrode active material used for the lower layer portion.

When the content of the conductive material contained in the upper layer portion and the lower layer portion is within the above-defined range, it is possible to improve nail safety and to provide cycle characteristics at least equal to those of the conventional battery.

The positive electrode active material used for each of the upper layer portion and the lower layer portion may be a lithium-containing oxide.

According to an embodiment of the present disclosure, the positive electrode active material is $Li_x(Ni_aCo_bMn_c)O_2$ (0.5<x<1.3, 0.5<a<0.7, 0<b<1, 0<c<1, a+b+c=1). In this case, the content of the conductive material contained in the lower layer portion is 10-59 parts by weight based on 100 parts by weight of the content of the conductive material contained in the upper layer portion.

According to another embodiment of the present disclosure, the positive electrode active material is $Li_x(Ni_aCo_bMn_c)O_2$ (0.5<x<1.3, 0.7<a<1, 0<b<1, 0<c<1, a+b+c=1) and the content of the conductive material contained in the lower layer portion is 10-30 parts by weight based on 100 parts by weight of the content of the conductive material contained in the upper layer portion.

Any binder polymer used conventionally in the art may be used without particular limitation for each of the upper layer portion and the lower layer portion. For examples, various types of binder polymers, such as polyvinylidene fluoride-co-hexafluoro propylene (PVDF-co-HFP), polyvinylidene fluoride (PVDF), polyacrylonitrile, polymethyl methacrylate, styrene-butadiene rubber (SBR) or carboxymethyl cellulose (CMC), may be used.

The current collector used for the positive electrode is a metal having high conductivity, and any metal may be used without particular limitation, as long as it allows easy adhesion of the positive electrode active material and binder polymer and has no reactivity in the voltage range of an electrochemical device. Particular examples of the positive electrode current collector include foil made of aluminum, nickel or a combination thereof.

The negative electrode that may be used together with the positive electrode may be at least one selected from the group consisting of lithium metal, a carbonaceous material and a metallic compound.

Particular examples of the carbonaceous material include low crystalline carbon and high crystalline carbon. Typical examples of low crystalline carbon include soft carbon and hard carbon. Typical examples of high crystalline carbon include natural graphite, Kish graphite, pyrolytic carbon, mesophase pitch based carbon fibers, meso-carbon microbeads, mesophase pitches, and high-temperature baked carbon, such as petroleum or coal tar pitch-derived cokes.

Particular examples of the metallic compound include compounds containing at least one metal element, such as Si, Ge, Sn, Pb, P, Sb, Bi, Al, Ga, In, Ti, Mn, Fe, Co, Ni, Cu, Zn, Ag, Mg, Sr and Ba. Although such metallic compound may be used in any one of the forms, including simple substance, alloy, oxides ($TiO_2$, $SnO_2$, etc.), nitride, sulfide, boride and alloy with lithium, simple substance, oxides and alloy with lithium may have high capacity. Particularly, metallic compounds which contain at least one element selected from Si and Sn and may contain at least one element selected from Si, Ge and Gn can provide a battery with higher capacity.

Non-limiting examples of the current collector for the negative electrode include foil made of copper, gold, nickel, copper alloy or a combination thereof. In addition, substrates including the above-mentioned materials may be stacked and used as the current collector.

Each of the positive electrode and the negative electrode may be obtained by blending an active material, a conductive material, a binder polymer and a high-boiling point solvent to provide two types of electrode active material slurry having a different content of conductive material, applying each electrode active material slurry onto the current collector to form two layers, carrying out drying and press molding, and carrying out heat treatment at a temperature of 50° C.-250° C. for 2 hours under vacuum.

In still another aspect, there is provided an electrochemical device which includes: an electrode assembly including a positive electrode, a negative electrode and a separator interposed between the positive electrode and the negative electrode; a nonaqueous electrolyte injected to the electrode assembly; and a battery casing receiving the electrode assembly and the nonaqueous electrolyte, wherein at least one of the positive electrode and the negative electrode is the electrode according to the present disclosure.

According to the present disclosure, the separator may be any porous substrate used for an electrochemical device. Particular examples of the porous substrate may include a polyolefin-based porous membrane or nonwoven web, but are not limited thereto.

Particular examples of the polyolefin-based porous membrane include a membrane formed of a polymer including a polyolefin-based polymer, such as polyethylene (e.g. high density polyethylene, linear low density polyethylene, low density polyethylene or ultrahigh molecular weight polyethylene), polypropylene, polybutyelene or polypentene, alone or in combination.

In addition to the polyolefin-based nonwoven web, particular examples of the nonwoven web include a nonwoven web formed of a polymer including polyethylene terephthalate, polybutylene terephthalate, polyester, polyacetal, polyamide, polycarbonate, polyimide, polyetheretherketone, polyethersulfone, polyphenylene oxide, polyphenylene sulfide or polyethylene naphthalene, alone or in combination. The structure of the nonwoven web may be a spunbond nonwoven web or melt blown nonwoven web including long fibers.

There is no particular limitation in thickness of the porous substrate. The porous substrate may have a thickness of 5 μm-50 μm. In addition, the size of pores present in the porous substrate and the porosity are not particularly limited. However, the pore size and porosity may be 0.0 μm 1-50 μm and 10%-95%, respectively.

Meanwhile, the porous substrate may further include a porous coating layer including inorganic particles and a binder polymer, on at least one surface thereof, in order to improve the mechanical strength of the separator including the porous substrate and to inhibit a short-circuit between the positive electrode and the negative electrode.

Meanwhile, the non-aqueous electrolyte may include an organic solvent and an electrolyte salt. The electrolyte salt is a lithium salt. Any lithium salt used conventionally for a nonaqueous electrolyte for a lithium secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or a combination of two or more of them.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates alone or in combination.

Typical examples of the organic solvent may include carbonate compounds such as cyclic carbonates, linear carbonates or mixtures thereof.

Particular examples of the cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and halides thereof, or a combination of two or more of them. Particular examples of such halides include fluoroethylene carbonate (FEC) but are not limited thereto.

In addition, particular examples of the linear carbonate compounds include any one selected from the group consisting of dimethyl carbonate (DMC), diethyl carbonate (DEC), dipropyl carbonate, ethyl methyl carbonate (EMC), methyl propyl carbonate and ethyl propyl carbonate, or a combination of two or more of them, but are not limited thereto.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electroconductivity when using such cyclic carbonates in combination with low-viscosity low-dielectric constant linear carbonates, such as dimethyl carbonate and diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether and ethyl propyl ether, or a combination of two or more of them, but are not limited thereto.

Among the organic solvents, particular examples of the esters include any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a combination of two or more of them, but are not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Herein, the electrochemical device includes any device which carries out electrochemical reaction, and particular examples thereof include all types of primary batteries, secondary batteries, fuel cells, solar cells or capacitors such as super capacitor devices. Particularly, the secondary batteries may include lithium secondary batteries, including lithium metal secondary batteries, lithium ion secondary batteries, lithium polymer secondary batteries or lithium ion polymer ion batteries.

Mode for Disclosure

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Positive Electrode

First, 96.9 wt % of $Li(Ni_{0.6}Co_{0.2}Mn_{0.2})O_2$ as a positive electrode active material, 1.1 wt % of carbon black (conductive material) and 2 wt % of PVdF (binder polymer) were added to N-methyl-2-pyrrolidone (NMP) as a solvent to form a positive electrode active material slurry for a lower layer portion. Herein, the positive electrode active material had an electroconductivity of 0.0002 S/cm.

Next, 96.1 wt % of $Li(Ni_{0.6}Co_{0.2}Mn_{0.2})O_2$ as a positive electrode active material, 1.9 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 $cm^2$ and vacuum dried. Then, the positive electrode active material slurry for an upper layer portion was coated thereon in the same amount.

Herein, the content of the conductive material used for the lower layer portion was 57 parts by weight based on 100 parts by weight of the content of the conductive material used for the upper layer portion.

Meanwhile, the positive electrode active material used for the positive electrode and physical properties thereof are shown in the following Table 1.

(2) Manufacture of Negative Electrode

Natural graphite was used as a negative electrode active material, and 96.1 wt % of natural graphite, 1 wt % of Super-P (conductive material), 2.2 wt % of SBR (binder polymer) and 0.7% of CMC were added to water as a solvent to form a slurry for a negative electrode active material. The slurry for a negative electrode active material was coated once onto copper foil, followed by drying and pressing, to provide a negative electrode. Herein, the content of natural graphite was 150 g.

(3) Manufacture of Separator

Polypropylene was uniaxially oriented through a dry process to obtain a microporous separator having a melting point of 165° C. and a width of one side of 200 mm.

(4) Manufacture of Lithium Secondary Battery

The separator was interposed between the positive electrode and the negative electrode to obtain an electrode assembly. Then, the electrode assembly was received in a pouch type battery casing and 1M $LiPF_6$ carbonate-based electrolyte solution was injected thereto to finish a battery.

Example 2

A lithium secondary battery was obtained in the same manner as Example 1, except that the positive electrode was manufactured as follows:

First, 97.67 wt % of $Li(Ni_{0.6}Co_{0.2}Mn_{0.2})O_2$ as a positive electrode active material, 0.33 wt % of carbon black (conductive material) and 2 wt % of PVdF (binder polymer) were added to N-methyl-2-pyrrolidone (NMP) as a solvent to form a positive electrode active material slurry for a lower layer portion.

Next, 95.33 wt % of $Li(Ni_{0.6}Co_{0.2}Mn_{0.2})O_2$ as a positive electrode active material, 2.67 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 $cm^2$ and vacuum dried. Then, the positive electrode active material slurry for an upper layer portion was coated thereon in the same amount.

Herein, the content of the conductive material used for the lower layer portion was 12 parts by weight based on 100 parts by weight of the content of the conductive material used for the upper layer portion. Meanwhile, the positive electrode active material used for the positive electrode and physical properties thereof are shown in the following Table 1.

Examples 3 and 4

Lithium secondary batteries were obtained in the same manner as Example 1, except that $Li(Ni_{0.8}Co_{0.1}Mn_{0.1})O_2$ was used as a positive electrode active material used for the upper layer portion and the lower layer portion, and the positive electrode active material was used in the same amount as shown in the following Table 2. Herein, the positive electrode active material had an electroconductivity of 0.01 S/cm.

Comparative Example 1

A lithium secondary battery was obtained in the same manner as Example 1, except that the positive electrode was manufactured as follows:

First, 96.5 wt % of $Li(Ni_{0.6}Co_{0.2}Mn_{0.2})O_2$ as a positive electrode active material, 1.5 wt % of carbon black (conductive material) and 2 wt % of PVdF (binder polymer) were added to N-methyl-2-pyrrolidone (NMP) as a solvent to form a positive electrode active material slurry. The positive electrode active material slurry was coated on aluminum foil in a loading amount of 480 mg/25 $cm^2$ and vacuum dried to obtain a positive electrode. Meanwhile, the positive electrode active material used for the positive electrode and physical properties thereof are shown in the following Table 1.

Comparative Example 2

A lithium secondary battery was obtained in the same manner as Example 1, except that the positive electrode was manufactured as follows:

First, 96.5 wt % of $Li(Ni_{0.6}Co_{0.2}Mn_{0.2})O_2$ as a positive electrode active material, 1.5 wt % of carbon black (conductive material) and 2 wt % of PVdF (binder polymer) were added to N-methyl-2-pyrrolidone (NMP) as a solvent to form a positive electrode active material slurry for a lower layer portion.

Next, 96.5 wt % of $Li(Ni_{0.6}Co_{0.2}Mn_{0.2})O_2$ as a positive electrode active material, 1.5 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 $cm^2$ and vacuum dried. Then, the positive electrode active material slurry for an upper layer portion was coated thereon in the same amount.

Herein, the content of the conductive material used for the lower layer portion was 100 parts by weight based on 100 parts by weight of the content of the conductive material used for the upper layer portion. Meanwhile, the positive electrode active material used for the positive electrode and physical properties thereof are shown in the following Table 1.

Comparative Example 3

A lithium secondary battery was obtained in the same manner as Example 1, except that the positive electrode was manufactured as follows:

First, 95.9 wt % of $Li(Ni_{0.6}Co_{0.2}Mn_{0.2})O_2$ as a positive electrode active material, 2.1 wt % of carbon black (conductive material) and 2 wt % of PVdF (binder polymer) were added to N-methyl-2-pyrrolidone (NMP) as a solvent to form a positive electrode active material slurry for a lower layer portion. Next, 97.1 wt % of $Li(Ni_{0.6}Co_{0.2}Mn_{0.2})O_2$ as a positive electrode active material, 0.9 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 cm$^2$ and vacuum dried. Then, the positive electrode active material slurry for an upper layer portion was coated thereon in the same amount.

Herein, the content of the conductive material used for the lower layer portion was 233 parts by weight based on 100 parts by weight of the content of the conductive material used for the upper layer portion. Meanwhile, the positive electrode active material used for the positive electrode and physical properties thereof are shown in the following Table 1.

Comparative Example 4

A lithium secondary battery was obtained in the same manner as Example 1, except that the positive electrode was manufactured as follows:

First, 96.84 wt % of $Li(Ni_{0.6}Co_{0.2}Mn_{0.2})O_2$ as a positive electrode active material, 1.16 wt % of carbon black (conductive material) and 2 wt % of PVdF (binder polymer) were added to N-methyl-2-pyrrolidone (NMP) as a solvent to form a positive electrode active material slurry for a lower layer portion. Next, 96.16 wt % of $Li(Ni_{0.6}Co_{0.2}Mn_{0.2})O_2$ as a positive electrode active material, 1.84 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 cm$^2$ and vacuum dried. Then, the positive electrode active material slurry for an upper layer portion was coated thereon in the same amount.

Herein, the content of the conductive material used for the lower layer portion was 63 parts by weight based on 100 parts by weight of the content of the conductive material used for the upper layer portion.

Comparative Example 5

A lithium secondary battery was obtained in the same manner as Example 1, except that the positive electrode was manufactured as follows:

First, 97.85 wt % of $Li(Ni_{0.6}Co_{0.2}Mn_{0.2})O_2$ as a positive electrode active material, 0.15 wt % of carbon black (conductive material) and 2 wt % of PVdF (binder polymer) were added to N-methyl-2-pyrrolidone (NMP) as a solvent to form a positive electrode active material slurry for a lower layer portion. Next, 95.15 wt % of $Li(Ni_{0.6}Co_{0.2}Mn_{0.2})O_2$ as a positive electrode active material, 2.85 wt % of carbon black (conductive material) and 2 wt % of PVdF (binder polymer) were added to N-methyl-2-pyrrolidone (NMP) as a solvent to form a positive electrode active material slurry for an upper layer portion.

The positive electrode active material slurry for a lower layer portion was coated first on aluminum foil in a loading amount of 240 mg/25 cm$^2$ and vacuum dried. Then, the positive electrode active material slurry for an upper layer portion was coated thereon in the same amount.

Herein, the content of the conductive material used for the lower layer portion was 5 parts by weight based on 100 parts by weight of the content of the conductive material used for the upper layer portion. Meanwhile, the positive electrode active material used for the positive electrode and physical properties thereof are shown in the following Table 1.

Comparative Examples 6-8

Lithium secondary batteries were obtained in the same manner as Example 1, except that $Li(Ni_{0.8}Co_{0.1}Mn_{0.1})O_2$ was used as a positive electrode active material used for the upper layer portion and the lower layer portion, and the positive electrode active material was used in the same amount as shown in the following Table 2. Herein, the positive electrode active material had an electroconductivity of 0.01 S/cm.

TABLE 1

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Composition of positive electrode active material slurry for lower layer portion: ($Li(Ni_{0.6}Co_{0.2}Mn_{0.2})O_2$:carbon black:PVDF (wt %) | 96.9:1.1:2 | 97.67:0.33:2 | 96.5:1.5:2 | 96.5:1.5:2 | 95.9:2.1:2 | 96.84:1.16:2 | 97.85:0.15:2 |
| Composition of positive electrode active material slurry for upper layer portion: ($Li(Ni_{0.6}Co_{0.2}Mn_{0.2})O_2$:carbon black:PVDF (wt %) | 96.1:1.9:2 | 95.33:2.67:2 | | 96.5:1.5:2 | 97.1:0.9:2 | 96.16:1.84:2 | 95.15:2.85:2 |

TABLE 1-continued

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Content of conductive material in lower layer portion (wt %) | 1.1 | 0.33 | 1.5 | 1.5 | 2.1 | 1.16 | 0.15 |
| Content of conductive material in upper layer portion (wt %) | 1.9 | 2.67 |  | 1.5 | 0.9 | 1.84 | 2.85 |
| Content of conductive material used for lower layer portion based on 100 parts by weight of content of conductive material used for upper layer portion (parts by weight) | 57 | 12 | — | 100 | 233 | 63 | 5 |
| Thickness of lower layer portion (um) | 70 | 70 | 140 | 70 | 70 | 70 | 70 |
| Thickness of upper layer portion (um) | 70 | 70 |  | 70 | 70 | 70 | 70 |
| Nail safety test | PASS | PASS | FAIL | FAIL | FAIL | FAIL | PASS |
| Cycle test/ Capacity maintenance (%) (after 500 cycles) | 90% | 87% | 87% | 90% | 87% | 88% | 75% |
| Resistance test result of lower layer portion (ohm * cm$^2$) | 0.305 | 0.34 | 0.22 | 0.137 | 0.205 | 0.28 | 0.42 |

TABLE 2

|  | Ex. 3 | Ex. 4 | Comp. Ex. 6 | Comp. Ex. 7 | Comp. Ex. 8 |
|---|---|---|---|---|---|
| Composition of positive electrode active material slurry for lower layer portion: (Li(Ni$_{0.8}$Co$_{0.1}$Mn$_{0.1}$)O$_2$:carbon black:PVDF (wt %) | 97.3:0.7:2 | 97.67:0.33:2 | 96.9:1.1:2 | 97.25:0.75:2 | 97.85:0.15:2 |
| Composition of positive electrode active material slurry for upper layer portion: (Li(Ni$_{0.8}$Co$_{0.1}$Mn$_{0.1}$)O$_2$:carbon black:PVDF (wt %) | 95.7:2.3:2 | 95.33:2.67:2 | 96.1:1.9:2 | 95.75:2.25:2 | 95.15:2.85:2 |
| Content of conductive material in lower layer portion (wt %) | 0.7 | 0.33 | 1.1 | 0.75 | 0.15 |
| Content of conductive material in upper layer portion (wt %) | 2.3 | 2.67 | 1.9 | 2.25 | 2.85 |

TABLE 2-continued

|  | Ex. 3 | Ex. 4 | Comp. Ex. 6 | Comp. Ex. 7 | Comp. Ex. 8 |
|---|---|---|---|---|---|
| Content of conductive material used for lower layer portion based on 100 parts by weight of content of conductive material used for upper layer portion (parts by weight) | 30 | 12 | 57 | 33 | 5 |
| Thickness of lower layer portion (um) | 70 | 70 | 70 | 70 | 70 |
| Thickness of upper layer portion (um) | 70 | 70 | 70 | 70 | 70 |
| Nail safety test | PASS | PASS | FAIL | FAIL | PASS |
| Cycle test/Capacity maintenance (%) (after 500 cycles) | 85 | 83 | 85 | 84 | 75 |
| Resistance test result of lower layer portion (ohm * cm$^2$) | 0.405 | 0.42 | 0.28 | 0.38 | 0.475 |

Test Examples

Method for Determining Electroconductivity of Positive Electrode Active Material The electroconductivity of a positive electrode active material was determined by using a power resistance measuring system (Carver Co. b&c) under a pressure condition of 2000 kgf.

Comparison of EIS Resistance

Figure 3:
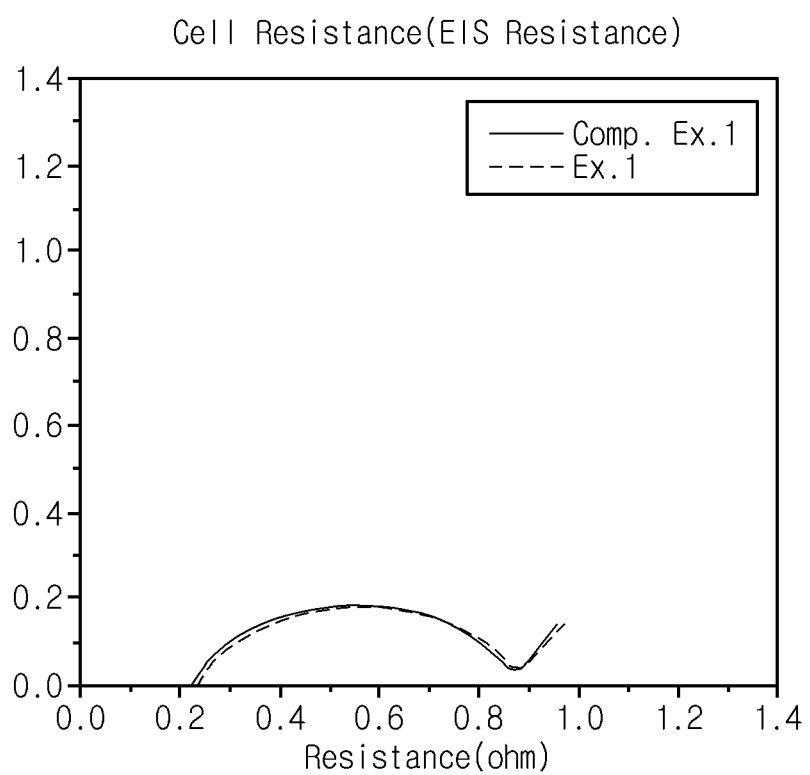
FIG. 3 is a graph illustrating the resistance of each of the cells according to Example 1 and Comparative Example 1.

Each of the batteries according to Example 1 and Comparative Example 1 were analyzed for its resistance through electrochemical impedance spectroscopy (EIS). The results are shown in FIG. 3.

EIS is a method for calculating resistance by applying an electric potential of 10 mV at a frequency of 500 kHz to 50 mHz in an alternating current mode, wherein the size of a semi-cycle means charge transfer resistance. Referring to FIG. 3, Example 1 shows a charge transfer resistance which is not significantly different from the charge transfer resistance of Comparative Example 1. This demonstrates that Example 1 maintains cell output performance equal to that of Comparative Example 1.

Test for Resistance in Lower Layer Portion of Positive Electrode

Figure 4:
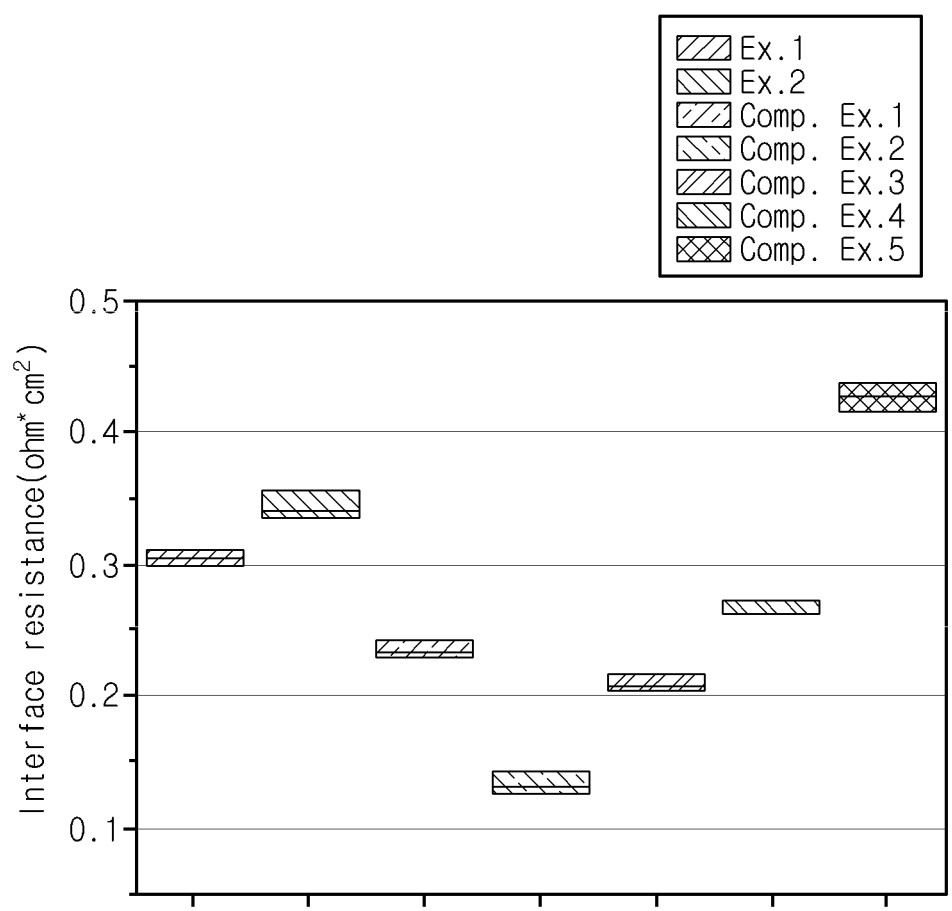
FIG. 4 is a graph illustrating the resistance of the lower layer portion in each of the electrodes according to Examples 1 and 2 and Comparative Examples 1 to 5.

To determine the resistance of an electrode, a probe was used to apply current to a pair of external electrodes from a constant current source and to measure the voltage between a pair of internal electrodes. In this manner, electrode resistance was determined. The resistance is an electrode resistance measurement obtained by using an electrode resistance measuring system available from Hioki Co. The results are shown in Tables 1 and 2 and FIG. 4.

Nail Penetration Test

To carry out a nail penetration test, a nail-shaped metallic body was allowed to penetrate through a cell at a predetermined speed so that the safety of the cell was determined by observing whether the cell causes ignition or explosion or not due to momentary overcurrent.

Particularly, the nail penetration test was carried out as follows:

Each of the batteries according to Examples and Comparative Examples was fully charged under a voltage of 4.2V and a nail having a diameter of 3 mm was allowed to penetrate through the center of the cell. Then, each cell was observed to determine whether it causes ignition or not. The results are shown in Tables 1 and 2.

Cycle Performance Test

Each of the lithium secondary batteries according to Examples 1 and 2 and Comparative Examples 1-5 was charged at room temperature to 4.2V in a CC-CV condition at 0.33C, and discharged to 2.5V in a constant current mode at 0.33C. This was repeated for 500 cycles to determine capacity maintenance. The results are shown in Table 1.

Particularly, as can be seen from Table 1, the resistance of the lower layer portion of the electrode according to Example 1 is higher as compared to Comparative Example 1. However, as can be seen from FIG. 3, example 1 shows overall cell output performance equal to that of Comparative Example 1.

In addition, as can be seen from Table 1, Examples 1 and 2 have a higher resistance as compared to Comparative Examples 1 to 3. In the case of Examples 1 and 2, the batteries passed the nail penetration test. However, Comparative Examples 1 to 3 could not pass the nail penetration test. This suggests that Examples show a higher resistance of the positive electrode active material at the portion adjacent to the current collector (i.e. at the lower layer portion) to reduce a short-circuit current, and thus pass the nail penetration test.

As can be seen from Table 1, Example 2 has a higher resistance as compared to Comparative Example 4. In the case of Comparative Example 4, the content of the conductive material is smaller at the lower layer portion as compared to the upper layer portion, but it includes a larger amount of conductive material as compared to Example 2. Thus, Comparative Example 4 shows an insufficient increase in resistance, resulting in a failure in the nail penetration test. On the other hand, in the case of Example 2, the lower layer portion has a larger interface resistance and thus can pass the nail penetration test. Meanwhile, in the case of Comparative Example 5, the battery passes the nail penetration test but has poor cycle performance due to an excessively small amount of conductive material, as can be seen from Table 1. Particularly, as compared to Example 2 wherein the content of the conductive material of the lower layer portion is 12 parts by weight based on that of the upper layer portion, Comparative Example 5 wherein the content of the conductive material of the lower layer portion is 5 parts by weight based on that of the upper layer portion shows cycle performance corresponding to about 75% of the cycle performance of Example 2. It can be seen that Example 2 having cycle performance about 12% higher than that of Comparative Example 5 shows significantly improved cycle performance.

Meanwhile, each of the lithium secondary batteries according to Examples 3 and 4 and Comparative Examples 6-8 was charged at room temperature to 4.2V in a CC-CV condition at 0.33C, and discharged to 2.5V in a constant current mode at 0.33C. This was repeated for 300 cycles to determine capacity maintenance. The results are shown in Table 2.

As can be seen from Table 2, Examples 3 and 4 have a content of the conductive material of the lower layer portion of 10-30 parts by weight based on 100 parts by weight of the content of the conductive material of the upper layer portion. Unlike Comparative Examples 6 and 7 which are not within the above-defined range, Examples 3 and 4 pass the nail safety test. This demonstrates that the lithium secondary batteries according to Examples 3 and 4 have improved safety.

Meanwhile, in the case of Comparative Example 8, although it passes the nail safety test, it shows significantly degraded cycle performance as compared to Examples 3 and 4 due to an excessively small amount of conductive material contained in the lower layer portion.

Examples 3 and 4 and Comparative Examples 6-8 have a larger electroconductivity of the positive electrode active material, as compared to Examples 1 and 2 and Comparative Examples 1-5.

As can be seen from Tables 1 and 2, in the case of Examples 3 and 4 using a positive electrode active material having higher electroconductivity, it is possible to provide a positive electrode not only having improved cycle performance but also having improved nail penetration resistance in the nail penetration safety test by using 10-30 parts by weight of the content of the conductive material contained in the lower layer portion based on 100 parts of the content of the conductive material contained in the upper layer portion.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

What is claimed is:

1. A positive electrode for a lithium secondary battery, which comprises:
    a positive electrode current collector; and
    a positive electrode active material layer including an upper layer portion and a lower layer portion,
    wherein each of the upper layer portion and the lower layer portion of the positive electrode active material layer comprises a positive electrode active material, binder polymer and a conductive material, and
    the positive electrode active material has an electroconductivity of 0.0001 S/cm-0.0004 S/cm, and a content of the conductive material contained in the lower layer portion is 12-57 parts by weight based on 100 parts by weight of a content of the conductive material contained in the upper layer portion, or
    the positive electrode active material has an electroconductivity of 0.008 S/cm-0.015 S/cm, and the content of the conductive material contained in the lower layer portion is 12-30 parts by weight based on 100 parts by weight of the content of the conductive material contained in the upper layer portion,
    wherein the positive electrode active material having the electroconductivity of 0.0001-0.0004 S/cm comprises $Li(Ni_{0.6}Co_{0.2}Mn_{0.2})O_2$,
    the positive electrode active material having the electroconductivity of 0.008-0.015 S/cm comprises $Li_x(Ni_aCo_bMn_c)O_2$, wherein
    $0.5<x<1.3$,
    $0.8 \le a \le 0.86$,
    $0.1 \le b \le 0.14$,
    $0.03 \le c \le 0.1$,
    $a+b+c=1$,
    wherein a content of the conductive material contained in the upper layer portion relative to 100 parts by weight of the positive electrode active material of the upper layer portion is 1.9 to 2.67 parts by weight, and
    a content of the conductive material contained in the lower layer portion relative to 100 parts by weight of the positive electrode active material of the lower layer portion is 0.33 to 1.1 parts by weight.

2. The positive electrode according to claim 1, wherein the positive active material and the binder polymer contained in the upper layer portion are same as those contained in the lower layer portion.

3. The positive electrode according to claim 1, wherein the positive electrode active material comprises $Li(Ni_{0.8}Co_{0.1}Mn_{0.1})O_2$.

4. The positive electrode according to claim 1, wherein the conductive material for the upper layer portion is same as that for the lower layer portion.

5. The positive electrode according to claim 1, wherein the lower layer portion has a thickness equal to or smaller than a thickness of the upper layer portion.

6. The positive electrode according to claim 5, wherein the lower layer portion has the thickness of 6 μm to 100 μm.

7. The positive electrode according to claim 1, wherein the conductive material is carbon black, graphite, carbon fibers, carbon nanotubes, metal power, conductive metal oxides, organic conductive material, or a combination of two or more of them.

8. A lithium secondary battery comprising: the positive electrode as defined in claim 1; a negative electrode; and a separator interposed between the positive electrode and the negative electrode.

9. The positive electrode according to claim 1, wherein a specific surface area of the conductive material contained in the lower layer portion is smaller than a specific surface area of the conductive material contained in the upper layer portion.

10. The positive electrode according to claim 9, wherein the specific surface area of the conductive material contained in the upper layer portion is 1-3 times of the specific surface area of the conductive material contained in the lower layer portion.

11. The positive electrode according to claim 1, wherein the positive electrode active material comprises a large-diameter positive electrode active material and a small-diameter positive electrode active material, wherein the large-diameter positive electrode active material has a D50 diameter of 8 μm to 20 μm, and the small-diameter positive electrode active material has a D50 diameter of 3 μm to 7 μm.

12. The positive electrode according to claim 11, wherein a weight ratio of the large-diameter positive electrode active material and the small-diameter positive electrode active material is 9:1-8:2.

13. A positive electrode for a lithium secondary battery, which comprises:
   a positive electrode current collector; and
   a positive electrode active material layer including an upper layer portion and a lower layer portion,
   wherein each of the upper layer portion and the lower layer portion of the positive electrode active material layer comprises a positive electrode active material, binder polymer and a conductive material, and
   the positive electrode active material consists of $Li(Ni_{0.6}Co_{0.2}Mn_{0.2})O_2$ and has an electroconductivity of 0.0001 S/cm-0.0004 S/cm, and a content of the conductive material contained in the lower layer portion is 10-59 parts by weight based on 100 parts by weight of a content of the conductive material contained in the upper layer portion, or
   the positive electrode active material consists of $Li_x(Ni_aCo_bMn_c)O_2$, wherein $0.5<x<1.3$, $0.8 \le a \le 0.86$, $0.1 \le b \le 0.14$, $0.03 \le c \le 0.1$, $a+b+c=1$, and has an electroconductivity of 0.008 S/cm-0.015 S/cm, and the content of the conductive material contained in the lower layer portion is 10-30 parts by weight based on 100 parts by weight of the content of the conductive material contained in the upper layer portion,
   wherein a content of the conductive material contained in the upper layer portion relative to 100 parts by weight of the positive electrode active material of the upper layer portion is 1.9 to 2.67 parts by weight, and
   a content of the conductive material contained in the lower layer portion relative to 100 parts by weight of the positive electrode active material of the lower layer portion is 0.33 to 1.1 parts by weight.

* * * * *